US012029243B2

(12) United States Patent
Liu et al.

(10) Patent No.: US 12,029,243 B2
(45) Date of Patent: Jul. 9, 2024

(54) ULTRASONIC ATOMIZATION CORE, ULTRASONIC ATOMIZER, AND ULTRASONIC ELECTRONIC CIGARETTE

(71) Applicant: CHINA TOBACCO HUNAN INDUSTRIAL CO., LTD., Hunan (CN)

(72) Inventors: Jianfu Liu, Hunan (CN); Kejun Zhong, Hunan (CN); Xiaoyi Guo, Hunan (CN); Wei Huang, Hunan (CN); Xinqiang Yin, Hunan (CN); Jianhua Yi, Hunan (CN); Yongquan Zhou, Hunan (CN)

(73) Assignee: CHINA TOBACCO HUNAN INDUSTRIAL CO., LTD., Hunan (CN)

( * ) Notice: Subject to any disclaimer, the term of this patent is extended or adjusted under 35 U.S.C. 154(b) by 755 days.

(21) Appl. No.: 17/258,110

(22) PCT Filed: Jul. 3, 2019

(86) PCT No.: PCT/CN2019/094558
§ 371 (c)(1),
(2) Date: Jan. 5, 2021

(87) PCT Pub. No.: WO2020/007321
PCT Pub. Date: Jan. 9, 2020

(65) Prior Publication Data

US 2021/0282456 A1 Sep. 16, 2021

(30) Foreign Application Priority Data

Jul. 6, 2018 (CN) ......................... 201810736932.0
Jul. 6, 2018 (CN) ......................... 201810736933.5

(51) Int. Cl.
*A24F 40/05* (2020.01)
*A24F 40/10* (2020.01)
(Continued)

(52) U.S. Cl.
CPC .............. *A24F 40/05* (2020.01); *A24F 40/10* (2020.01); *A24F 40/42* (2020.01); *A24F 40/44* (2020.01);
(Continued)

(58) Field of Classification Search
CPC .......... A24F 40/05; A24F 40/10; A24F 40/42; A24F 40/44; A24F 40/485; B05B 17/0607
See application file for complete search history.

(56) References Cited

U.S. PATENT DOCUMENTS 9,497,998 B2 * 11/2016 Chen ........................ H05B 3/40
11,278,055 B2 * 3/2022 Liu ........................ A24F 40/46
(Continued)

FOREIGN PATENT DOCUMENTS

CN 204070569 U 1/2015
CN 205912905 U 2/2017
(Continued)

OTHER PUBLICATIONS

International Search Report issued in International Application No. PCT/CN2019/094558 dated Oct. 11, 2019, 3 pages.

*Primary Examiner* — Abdullah A Riyami
*Assistant Examiner* — Thang H Nguyen
(74) *Attorney, Agent, or Firm* — MASCHOFF BRENNAN; Ran Pang; Michael Mauriel

(57) ABSTRACT

An ultrasonic atomization core (17), an ultrasonic atomizer, and an ultrasonic electronic cigarette are disclosed. The ultrasonic atomization core (17) comprises an atomization sleeve (1). The atomization sleeve is provided with an
(Continued)

ultrasonic atomization sheet (2) and e-liquid guide cotton (3) that communicates the outside with an atomization surface of the ultrasonic atomization sheet (2). The atomization surface of the ultrasonic atomization sheet (2) is a concave surface. The e-liquid guide cotton (3) has a convex surface corresponding to the atomization surface. The curvature of the convex surface of the e-liquid guide cotton (3) is greater than or equal to the curvature of the atomization surface of the ultrasonic atomization sheet (2). The convex surface of the e-liquid guide cotton (3) is in contact with the atomization surface of the ultrasonic atomization sheet (2).

17 Claims, 11 Drawing Sheets

(51) Int. Cl.

| | |
|---|---|
| ***A24F 40/42*** | (2020.01) |
| ***A24F 40/44*** | (2020.01) |
| ***A24F 40/485*** | (2020.01) |
| ***B05B 17/06*** | (2006.01) |

(52) U.S. Cl.
CPC ........ *A24F 40/485* (2020.01); *B05B 17/0607* (2013.01)

(56) References Cited

U.S. PATENT DOCUMENTS

| | | | | |
|---|---|---|---|---|
| 11,523,634 | B2 * | 12/2022 | Liu | B05B 17/06 |
| 2017/0290370 | A1 * | 10/2017 | Garthaffner | A61M 11/042 |
| 2018/0255831 | A1 * | 9/2018 | Lipowicz | H05B 1/0244 |
| 2020/0029624 | A1 * | 1/2020 | Liu | A24F 40/49 |
| 2021/0235771 | A1 * | 8/2021 | Watanabe | A24F 40/44 |

FOREIGN PATENT DOCUMENTS

| | | | |
|---|---|---|---|
| CN | 206251936 | U | 6/2017 |
| CN | 206453256 | U | 9/2017 |
| CN | 107959143 | A | 4/2018 |
| KR | 20160096745 | A | 8/2016 |
| WO | 2015071703 | A1 | 5/2015 |

* cited by examiner

ULTRASONIC ATOMIZATION CORE, ULTRASONIC ATOMIZER, AND ULTRASONIC ELECTRONIC CIGARETTE

CROSS REFERENCE TO RELATED APPLICATIONS

This application is a U.S. National Phase application under 35 U.S.C. § 371 of International Application No. PCT/CN2019/094558 filed on Jul. 3, 2019, which claims priority to Chinese Application No. 201810736932.0 filed on Jul. 6, 2018, and Chinese Application No. 201810736933.5 filed on Jul. 6, 2018. The entire contents of these applications are hereby incorporated herein by reference.

FIELD OF THE INVENTION

The present invention particularly relates to an ultrasonic atomization core, an ultrasonic atomizer, and an ultrasonic electronic cigarette.

BACKGROUND OF THE INVENTION

An existing ultrasonic atomization core comprises an atomization sleeve, and an ultrasonic atomization sheet and e-liquid guide cotton that communicates the outside with an atomization surface of the ultrasonic atomization sheet are arranged in the atomization sleeve. When working, the e-liquid guide cotton guides outside liquid smoke generation matters to the ultrasonic atomization sheet for atomizing to generate smoke.

The existing ultrasonic atomization sheet is generally planar, and the temperature at its center position is relatively high, so that the e-liquid guide cotton in contact with the ultrasonic atomization sheet is easily burnt through and burnt out, which affects the atomization effect and shortens the service lives of the e-liquid guide cotton and the ultrasonic atomization sheet. Meanwhile, the planar ultrasonic atomization sheet does not have the effect of accumulating energy, which requires higher working power, so the power endurance is low. In addition, when the atomization core is installed in a housing of an atomizer, a cylindrical elastic electrode of the atomizer directly abuts against the center of the ultrasonic atomization sheet, so that the ultrasonic atomization sheet is easily broken with a little force during assembly.

In the existing ultrasonic atomizer, the ultrasonic atomization core is arranged in the housing, and the atomization core is connected with the housing through a connecting sleeve. In the prior art, in order to ensure the reliability of connection between the atomization core and the housing, an upper section of the atomization core is usually riveted and connected into a lower section of the connecting sleeve. When the atomization core is damaged, the atomization core cannot be replaced separately, so the ultrasonic atomizer is discarded as a whole, and the use cost is high.

SUMMARY OF THE INVENTION

The objective of the present invention is, in view of the above-mentioned shortcomings of the prior art, to provide an improved ultrasonic atomization core, ultrasonic atomizer and ultrasonic electronic cigarette, where e-liquid is guided to the center of an ultrasonic atomization sheet more easily, making it difficult for the e-liquid guide cotton to be burnt through or be burnt out, the atomization effect is good, and the service lives of the e-liquid guide cotton and the ultrasonic atomization sheet are long; the ultrasonic atomization sheet can effectively accumulate energy to generate smoke by means of atomization, so low working power is required, and the power endurance is strong; during assembly, the ultrasonic atomization sheet is stressed uniformly and is difficult to break; and the atomization core can be replaced separately, which reduces the use cost.

In order to solve the above technical problems, the technical solution adopted by the present invention is as follows:

An ultrasonic atomization core comprises an atomization sleeve, and an ultrasonic atomization sheet and e-liquid guide cotton that communicates the outside with an atomization surface of the ultrasonic atomization sheet are arranged in the atomization sleeve, wherein the atomization surface of the ultrasonic atomization sheet is a concave surface, the e-liquid guide cotton has a convex surface corresponding to the atomization surface, the curvature of the convex surface of the e-liquid guide cotton is greater than or equal to the curvature of the atomization surface of the ultrasonic atomization sheet, and the convex surface of the e-liquid guide cotton is in contact with the atomization surface of the ultrasonic atomization sheet.

With the above structure, since the atomization surface of the ultrasonic atomization sheet is a concave surface, and the e-liquid guide cotton has a convex surface in contact with the atomization surface of the ultrasonic atomization sheet, the e-liquid guide cotton accelerates e-liquid guide by means of the curvature of the convex surface itself on the surface in contact with the concave surface, liquid smoke generation matters quickly flow to the center position of the ultrasonic atomization sheet, the center position of the ultrasonic atomization sheet with a higher temperature can be timely replenished with liquid, the temperature of the center position of the ultrasonic atomization sheet can be reduced, the e-liquid guide cotton at the center position of the ultrasonic atomization sheet can be prevented from being burnt through due to excessive temperature, the ultrasonic atomization sheet would not stop working due to dry burning, the atomization effect is good, and the e-liquid guide cotton and the ultrasonic atomization sheet have long service lives. Meanwhile, the area of curved contact surface between the e-liquid guide cotton and the ultrasonic atomization sheet is larger, more smoke is generated by means of atomization, the amount of smoke is guaranteed, users' requirements for smoke are met, and the user experience is improved. In addition, because the concave atomization surface of the ultrasonic atomization sheet has the function of focusing energy, the required working power is low and the power endurance is strong.

The atomization surface of the ultrasonic atomization sheet is a concave surface, and the e-liquid guide cotton has a convex surface in contact with the concave surface of the ultrasonic atomization sheet. When the ultrasonic atomization sheet is working, the ultrasonic atomization sheet generates high-frequency oscillation, making liquid smoke generation matters to scatter and splash to the edge of the concave surface on the concave surface of the ultrasonic atomization sheet, so many droplets are accumulated on the concave surface, and the droplets are easily absorbed by the e-liquid guide cotton and flow back to the concave surface to participate in the atomization again, thereby saving the liquid smoke generation matters, reducing the use cost, and also preventing users from inhaling the splashed droplets.

The curvature of the convex surface of the e-liquid guide cotton may be greater than or equal to the curvature of the atomization surface of the ultrasonic atomization sheet. When the curvature of the convex surface of the e-liquid guide cotton is equal to the curvature of the atomization surface of the ultrasonic atomization sheet, the liquid smoke generation matters are guided more easily on the curved contact surface. When the curvature of the convex surface of the e-liquid guide cotton is greater than the curvature of the atomization surface of the ultrasonic atomization sheet, a part of the liquid smoke generation matters remains in the gap between the convex surface of the e-liquid guide cotton and the atomization surface of the ultrasonic atomization sheet. Once replenished, the liquid smoke generation matters can flow to the center of the ultrasonic atomization sheet faster through the gap, so that the effects of liquid guide and atomization are better, the user smokes the same amount of smoke per puff with identical taste, and the user experience is improved.

As a preferred mode, the ultrasonic atomization sheet is spherical, the e-liquid guide cotton has a spherical portion, the curvature of the spherical portion of the e-liquid guide cotton is greater than or equal to the curvature of the spherical ultrasonic atomization sheet, and the convex surface of the spherical portion of the e-liquid guide cotton is in contact with the concave surface of the ultrasonic atomization sheet.

With the above structure, the ultrasonic atomization sheet and the e-liquid guide cotton are more convenient to fabricate.

As a preferred mode, the central axis of the spherical portion of the e-liquid guide cotton is collinear with the central axis of the ultrasonic atomization sheet.

Further, the ultrasonic atomization core further comprises an inner sleeve sleeved in the atomization sleeve, the e-liquid guide cotton further comprises a hollow cylindrical portion, the hollow cylindrical portion is connected with the spherical portion to form a cup-shaped structure, the hollow cylindrical portion is sandwiched between the atomization sleeve and the inner sleeve, and the atomization sleeve is provided with a through hole that communicates the hollow cylindrical portion with the outside.

Further, the ultrasonic atomization core further comprises a cotton pressing structure, one end of the cotton pressing structure abuts against the inner sleeve, and the other end of the cotton pressing structure abuts against the concave surface of the spherical portion of the e-liquid guide cotton.

The cotton pressing structure can ensure reliable contact between the e-liquid guide cotton and the atomization surface.

As a preferred mode, the cotton pressing structure comprises a ring portion and at least three first elastic strands, fixed ends of the first elastic strands are connected with the ring portion, free ends of the first elastic strands abut against the spherical portion of the e-liquid guide cotton, and the ring portion abuts against the inner sleeve.

As a preferred mode, the first elastic strands are uniformly arranged along the circumference of the ring portion, and the free ends of the first elastic strands are arc-shaped and attached to the concave surface of the spherical portion of the e-liquid guide cotton, so that the e-liquid guide cotton is uniformly stressed.

Based on the same inventive concept, the present invention further provides an ultrasonic atomizer, comprising a housing in which the ultrasonic atomization core is arranged.

Further, the housing is provided with an elastic electrode that abuts against the convex surface of the ultrasonic atomization sheet.

As a preferred mode, the elastic electrode comprises a cylindrical portion and at least three second elastic strands, fixed ends of the second elastic strands are connected with the cylindrical portion, and free ends of the second elastic strands abut against the convex surface of the ultrasonic atomization sheet.

The elastic electrode with the above-mentioned structure can ensure that four sides of the ultrasonic atomization sheet are stressed uniformly, prevent the ultrasonic atomization sheet from being broken due to a single direction of force applied thereto, and is easy to assemble.

As a preferred mode, the second elastic strands are uniformly arranged on an end surface of the cylindrical portion, and the free ends of the second elastic strands are arc-shaped and attached to the convex surface of the ultrasonic atomization sheet.

As another preferred mode, the atomization core is connected to the housing through a connecting sleeve; the housing comprises a top cover, a base and a bottom cover that are connected in sequence, the base is detachably connected to the bottom cover, a middle section of the outer side wall of the atomization core is in clearance fit with the inner side wall of the base, an upper section of the outer side wall of the atomization core is provided with an external threaded portion, and the inner side wall of the connecting sleeve is provided with an internal threaded portion matching the external threaded portion.

With the above structure, the atomization core is screwed and fixed with the connecting sleeve. When the atomization core is to be replaced, the bottom cover is removed from the base to expose the lower section of the atomization core, and the lower section of the atomization core is held by hand and rotated to take out the atomization core from the housing of the atomizer, so that the atomization core is replaced separately, the discard of the whole atomizer is avoided when the atomization core is damaged, the operation is simple and convenient, and the use cost is reduced.

Further, a bottom end of the atomization core abuts against an inner bottom surface of the bottom cover.

The bottom end of the atomization core abuts against the inner bottom surface of the bottom cover, so that the atomization core has better stability after assembly.

Further, an e-liquid bin is arranged in the top cover, and the atomization sleeve is provided with a through hole that communicates the e-liquid guide cotton with the e-liquid bin; a middle section of the outer side wall of the atomization sleeve is in clearance fit with the inner side wall of the base, and the external threaded portion is arranged on an upper section of the outer side wall of the atomization sleeve.

Further, the connecting sleeve has a baffle portion opposite to an upper part of the through hole, and an e-liquid passing gap that communicates the e-liquid bin with the through hole is formed between the baffle portion and the atomization sleeve.

During normal smoking, the baffle portion does not completely cover the through hole, and e-liquid in the e-liquid bin passes through the e-liquid passing gap and the through hole in sequence to supply e-liquid for the e-liquid guide cotton. When the atomization core is removed, the e-liquid at the through hole slowly flows through the baffle portion and flows into the e-liquid bin with the removal of the atomization core, so as to prevent e-liquid leakage when the atomization core is removed. Due to the baffle portion, when the atomization core is removed, a lot of e-liquid can be stored in the e-liquid bin, which prevents the e-liquid in the e-liquid bin from overflowing during the removal of the atomization core.

Further, a top of the top cover is provided with a suction nozzle that is axially rotatable about the axis of the top cover, and the suction nozzle is provided with an e-liquid injection hole that can be aligned or misaligned with the e-liquid passing hole of the e-liquid bin.

The suction nozzle is rotated, making the e-liquid injection hole to align or misalign with the e-liquid passing hole to open or close the e-liquid bin for injecting e-liquid.

Further, the ultrasonic atomizer further comprises a driving mechanism, and the rotation of the suction nozzle drives the connecting sleeve through the driving mechanism to move axially along an electronic cigarette to open or close the through hole; the inner side wall of the connecting sleeve has an inner smooth portion above the internal threaded portion, and the outer side wall of the atomization sleeve has an outer smooth portion below the external threaded portion; when the connecting sleeve moves axially along the electronic cigarette, the inner smooth portion is opposite to the external threaded portion, and the outer smooth portion is opposite to the internal threaded portion.

With the above structure, when e-liquid is to be injected, the suction nozzle is rotated to open the e-liquid passing hole on the e-liquid bin, and the rotation of the suction nozzle drives the connecting sleeve through the driving mechanism to move axially to close the through hole, so as to prevent e-liquid leakage during e-liquid injection. After the e-liquid is injected, the suction nozzle is rotated to close the e-liquid passing hole on the e-liquid bin, and the rotation of the suction nozzle drives the connecting sleeve through the driving mechanism to move axially to open the through hole, so as to normally guide e-liquid for smoking.

When the connecting sleeve moves axially along the electronic cigarette, the inner smooth portion is opposite to the external threaded portion, and the outer smooth portion is opposite to the internal threaded portion. Accordingly, during the movement of the connecting sleeve, the connecting sleeve also moves axially relative to the atomization core. Therefore, the connecting sleeve would not get stuck and fail to close or open the through hole, and the atomization core would not be separated from the e-liquid bin or shake due to the axial movement of the connecting sleeve.

As a preferred mode, the driving mechanism comprises a fixing sleeve, an upper section of the fixing sleeve is fixedly connected with the suction nozzle, a lower section of the fixing sleeve passes through an air guide hole on the e-liquid bin and is in clearance fit with the e-liquid bin, a top section of the outer side wall of the connecting sleeve is screwed with a top section of the inner side wall of the fixing sleeve, a middle section of the outer side wall of the connecting sleeve has an outer limit plane that limits the circumferential rotation of the connecting sleeve, and the inner side wall of the air guide hole has an inner limit plane corresponding to the outer limit plane.

With the above structure, the upper section of the fixing sleeve is fixedly connected with the suction nozzle, the lower section of the fixing sleeve is arranged in the air guide hole, the fixing sleeve can rotate circumferentially relative to the e-liquid bin, and the rotation of the suction nozzle can drive the fixing sleeve to rotate circumferentially relative to the e-liquid bin. Due to the coordination of the outer limit plane and the inner limit plane, the circumferential rotation of the connecting sleeve is limited. Therefore, when the suction nozzle is rotated, the fixing sleeve rotates and the fixing sleeve is axially fixed, which drives the connecting sleeve to move up and down relative to the e-liquid bin, that is, when the suction nozzle is rotated, the connecting sleeve moves axially along the electronic cigarette to open or close the through hole.

Further, a sealing ring is arranged between the outer side wall of the atomization sleeve and the inner side wall of the base to prevent e-liquid leakage of the e-liquid bin.

Based on the same inventive concept, the present invention further provides an ultrasonic electronic cigarette, comprising the ultrasonic atomizer.

Compared with the prior art, the present invention has the following advantages:

First, the e-liquid is guided to the center of the ultrasonic atomization sheet more easily, making it difficult for the e-liquid guide cotton to be burnt through or be burnt out, the atomization effect is good, and the service lives of the e-liquid guide cotton and the ultrasonic atomization sheet are long.

Second, the ultrasonic atomization sheet can effectively accumulate energy to generate smoke by means of atomization, so low working power is required, and the power endurance is strong.

Third, the ultrasonic atomization sheet is uniformly stressed during assembly and is difficult to break.

Fourth, the atomization core can be replaced separately, which reduces the use cost.

Fifth, an e-liquid passage can be cut off when e-liquid is injected into the e-liquid bin, which prevents e-liquid leakage and prevents the ultrasonic atomization sheet from being immersed into the e-liquid.

Figure 1:
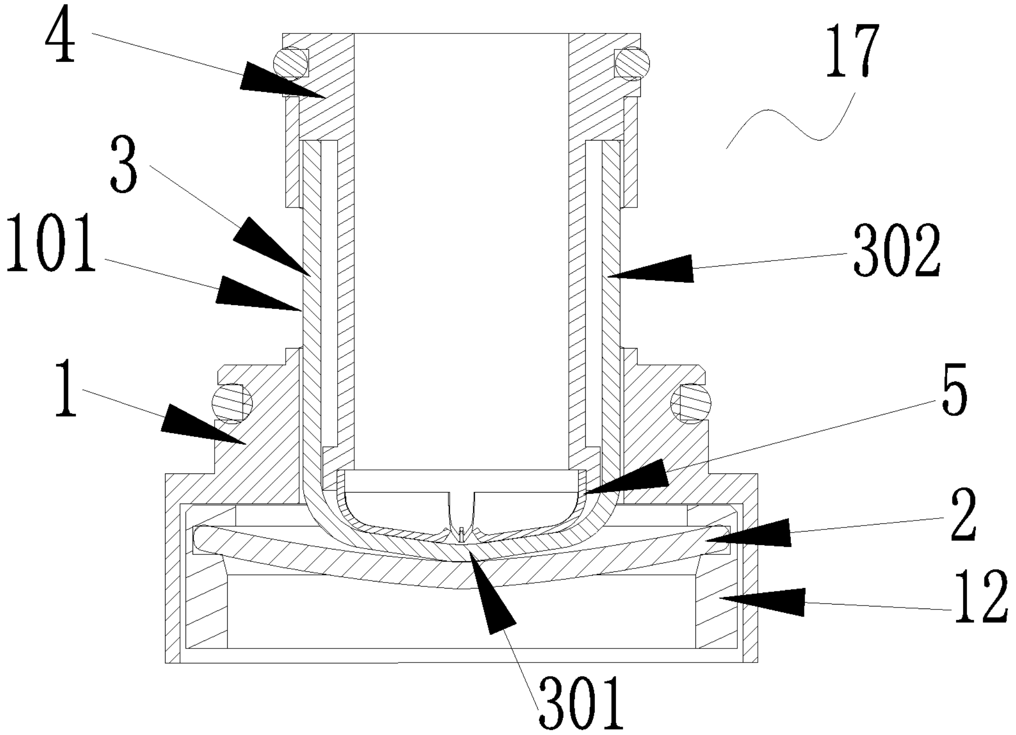
FIG. 1 is a structure diagram of an embodiment of an ultrasonic atomization core.
Figure 2:
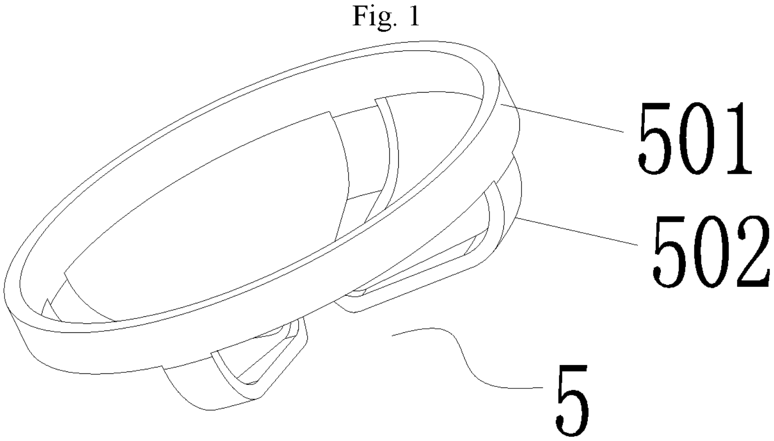
FIG. 2 is a structure diagram of a cotton pressing structure.

In the figures: 1 atomization sleeve, 101 through hole, 102 outer smooth portion, 2 ultrasonic atomization sheet, 3 e-liquid guide cotton, 301 spherical portion, 302 hollow cylindrical portion, 4 inner sleeve, 5 cotton pressing structure, 501 ring portion, 502 first elastic strand, 6 housing, 601 top cover, 602 base, 6021 hook, 603 bottom cover, 6031 clamping groove, 7 elastic electrode, 701 cylindrical portion, 702 second elastic strand, 8 connecting sleeve, 801 internal threaded portion, 802 baffle portion, 803 outer limit plane, 804 inner smooth portion, 9 suction nozzle, 901 air inlet, 902 e-liquid injection hole, 10 e-liquid bin, 1001 e-liquid passing hole, 1002 air guide hole, 1003 inner limit plane, 11 sealing gasket, 12 silica gel seat, 13 electrode ring, 14 air pipe, 15 air outlet passage, 16 protective sheet, 17 atomization core, 1701 external threaded portion, 18 e-liquid passing gap, 19 fixing sleeve, 20 sealing ring.

DETAILED DESCRIPTION OF EMBODIMENTS

Embodiment 1

As shown in FIGS. 1 to 4, an ultrasonic atomization core 17 comprises an atomization sleeve 1, an ultrasonic atomization sheet 2 and e-liquid guide cotton 3 that communicates the outside with an atomization surface of the ultrasonic atomization sheet 2 are arranged in the atomization sleeve 1, the ultrasonic atomization sheet 2 is spherical, the e-liquid guide cotton 3 has a spherical portion 301, the curvature of the spherical portion 301 of the e-liquid guide cotton 3 is greater than or equal to the curvature of the spherical ultrasonic atomization sheet 2, and a convex surface of the spherical portion 301 of the e-liquid guide cotton 3 is in contact with a concave surface of the ultrasonic atomization sheet 2. The central axis of the spherical portion 301 of the e-liquid guide cotton 3 is collinear with the central axis of the ultrasonic atomization sheet 2.

Figure 4:
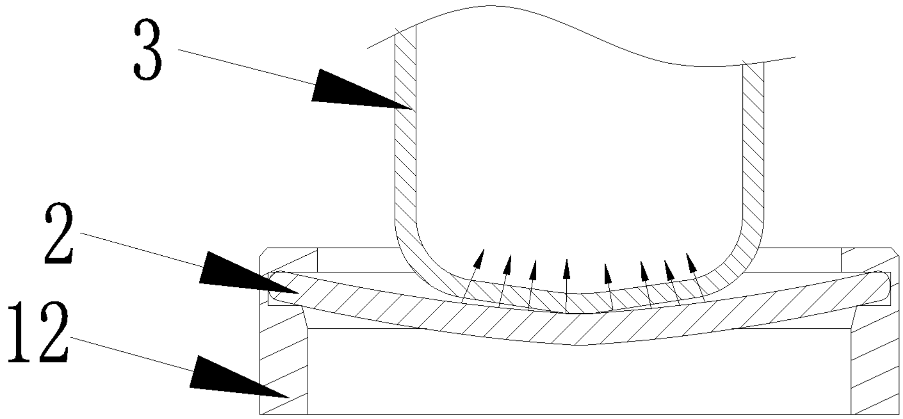
FIG. 4 is a schematic diagram of a smoke direction of the ultrasonic atomization core.
Figure 5:
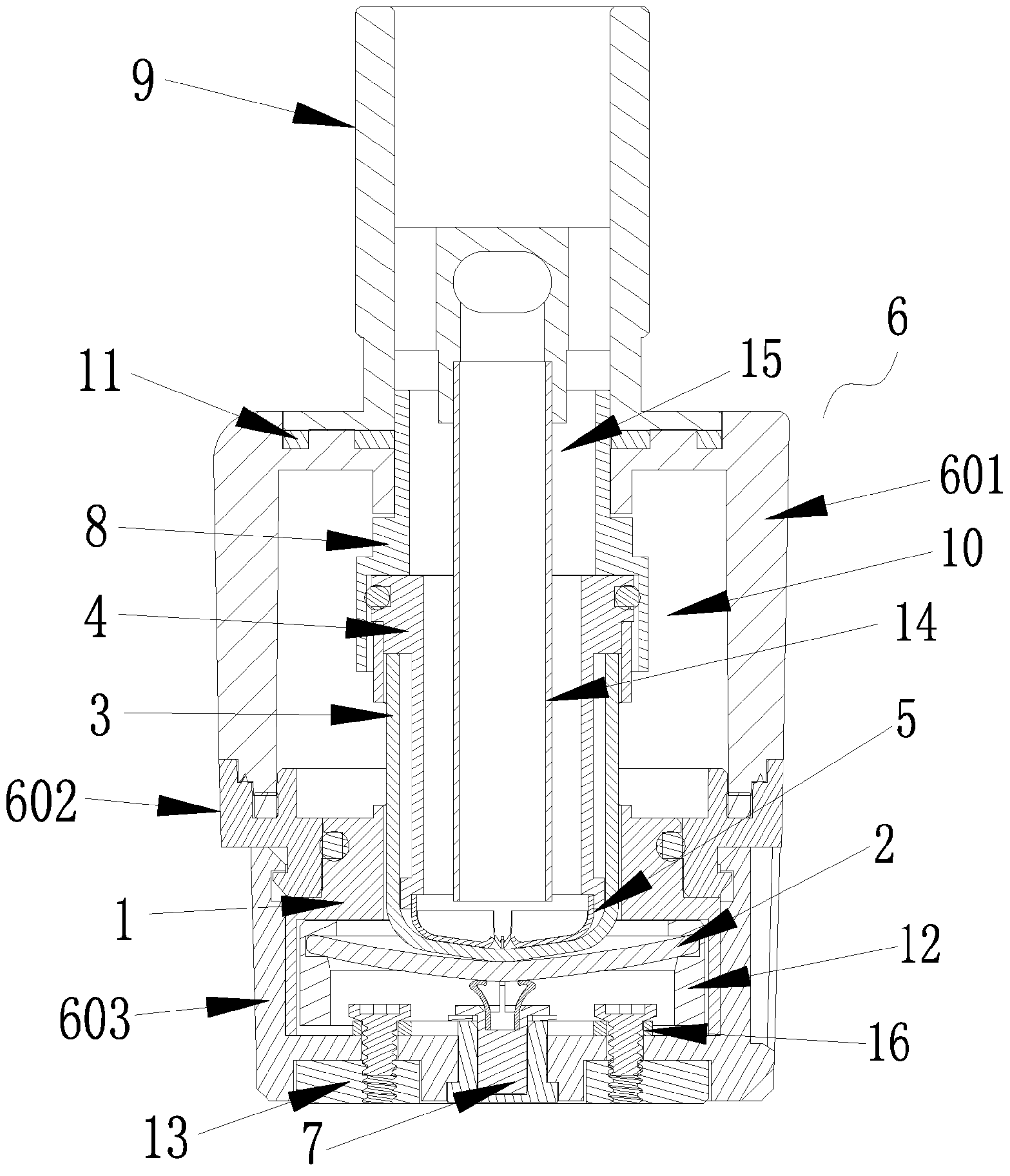
FIG. 5 is a structure diagram of an embodiment of an ultrasonic atomizer.
Figure 6:
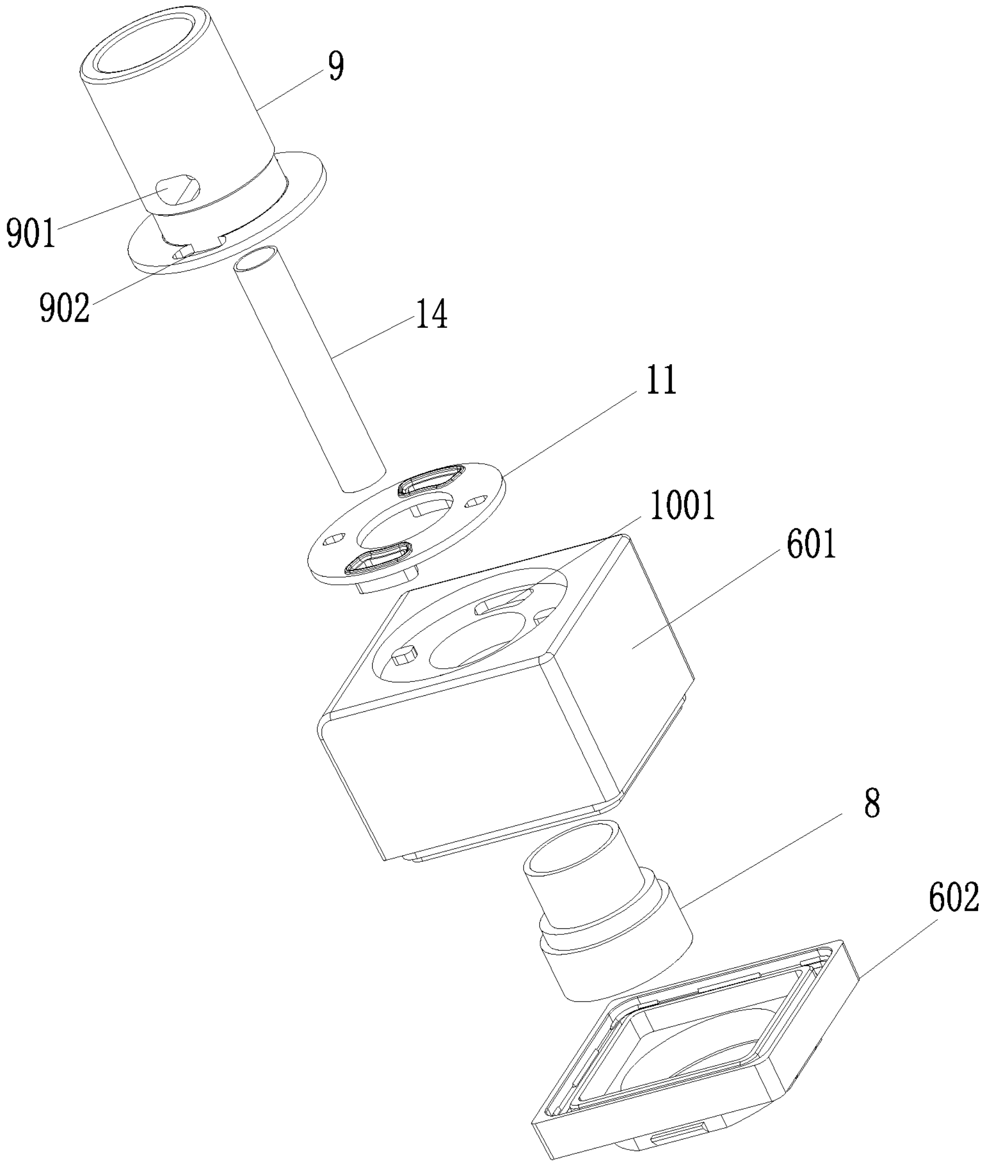
FIG. 6 is an exploded view of the upper part in FIG. 5.
Figure 7:
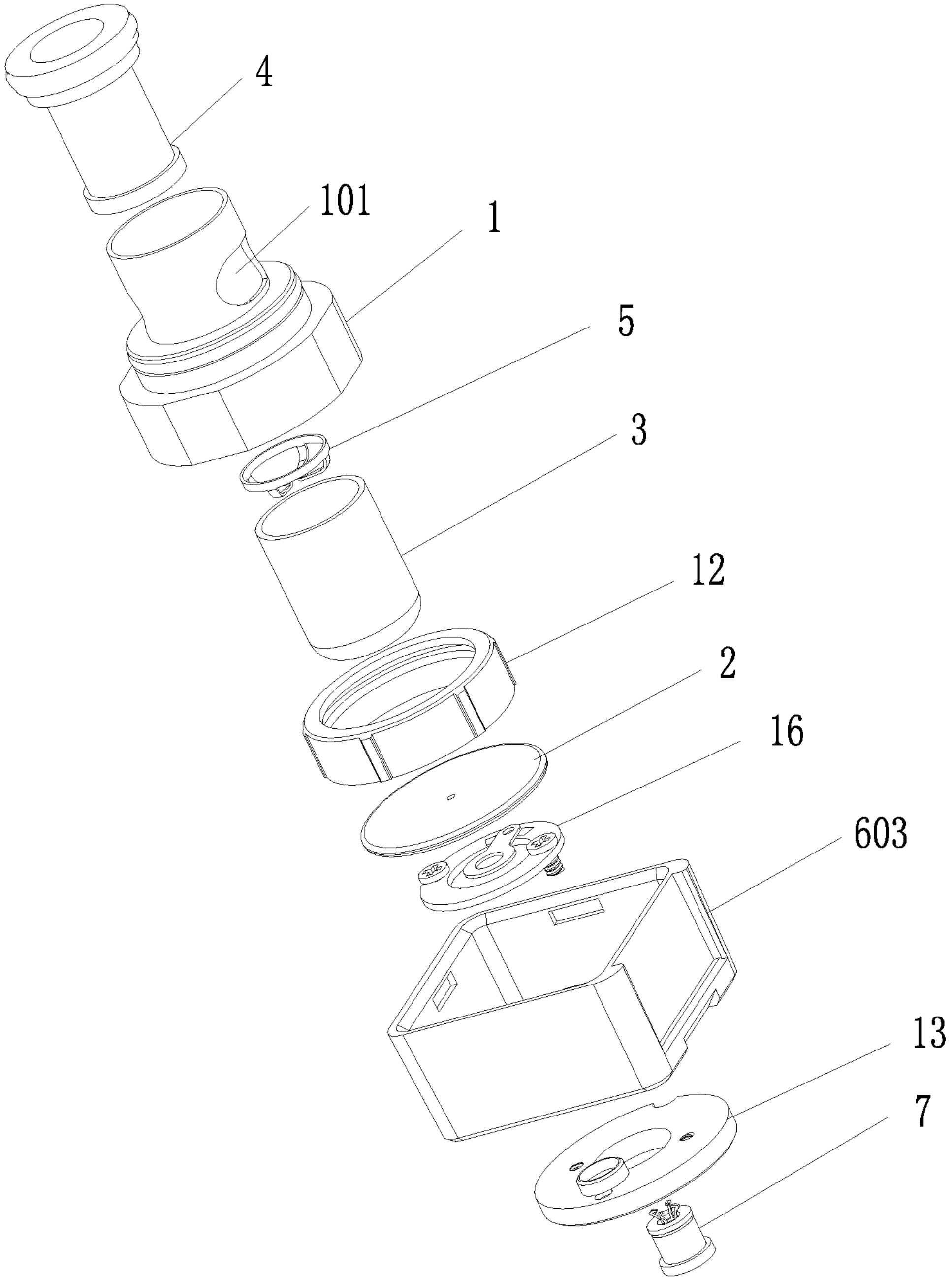
FIG. 7 is an exploded view of the lower part in FIG. 5.
Figure 8:
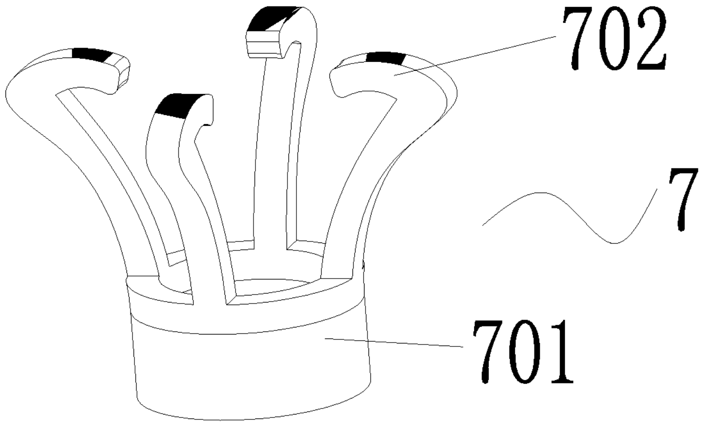
FIG. 8 is a structure diagram of an elastic electrode.
Figure 9:
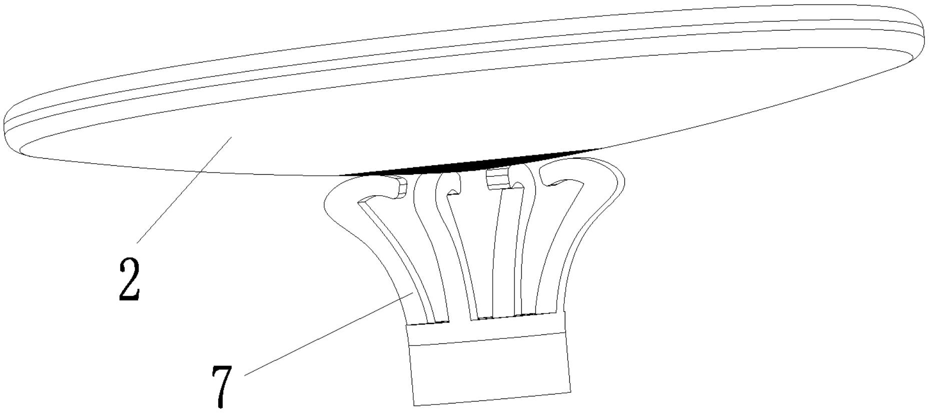
FIG. 9 is a diagram showing the positional relationship between an ultrasonic atomization sheet and the elastic electrode.
Figure 10:
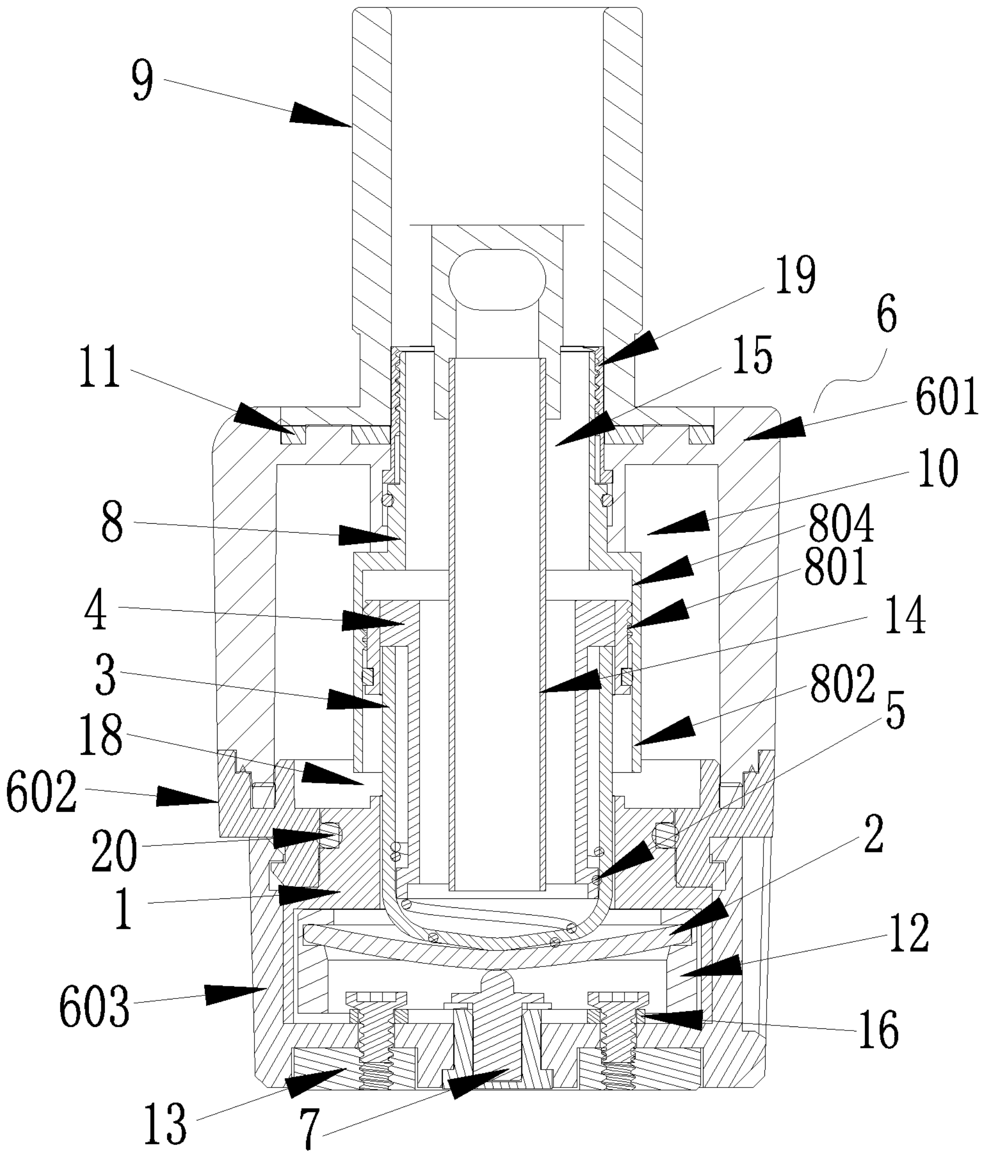
FIG. 10 is a structure diagram of another embodiment of an ultrasonic atomizer.
Figure 11:
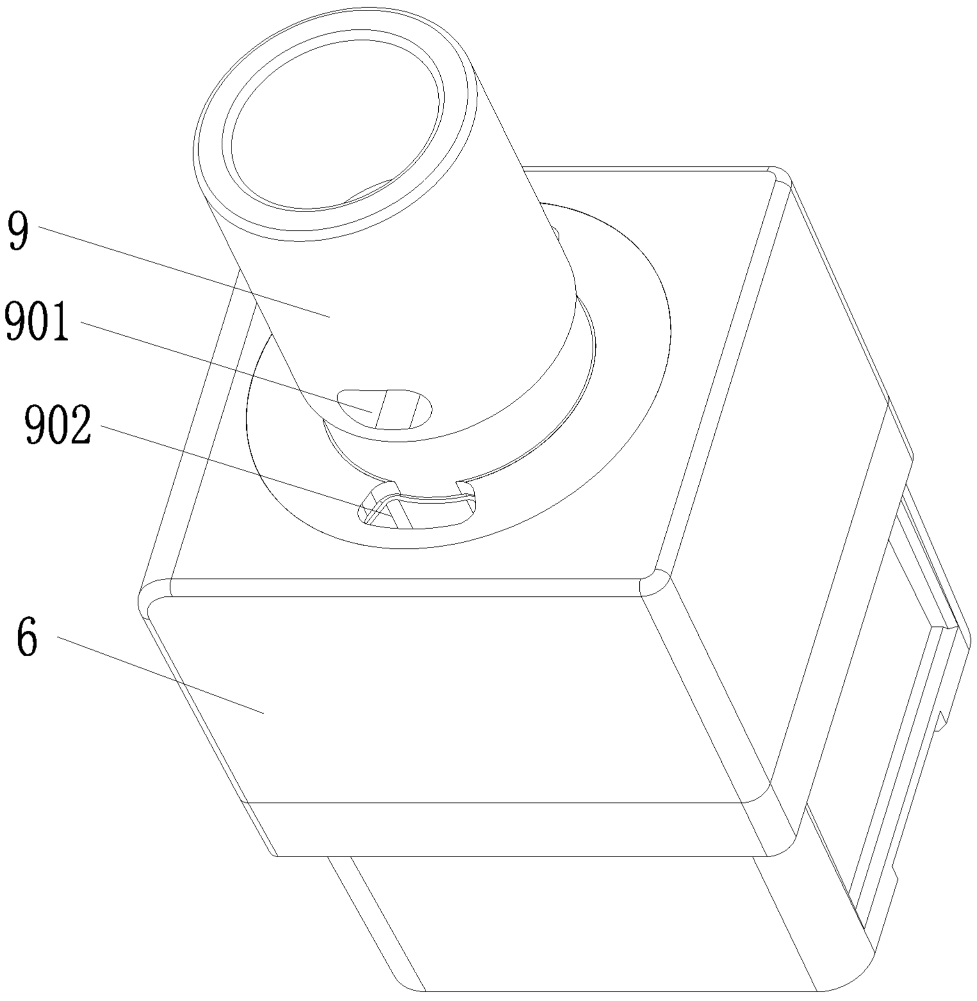
FIG. 11 is a schematic external view of FIG. 10.
Figure 12:
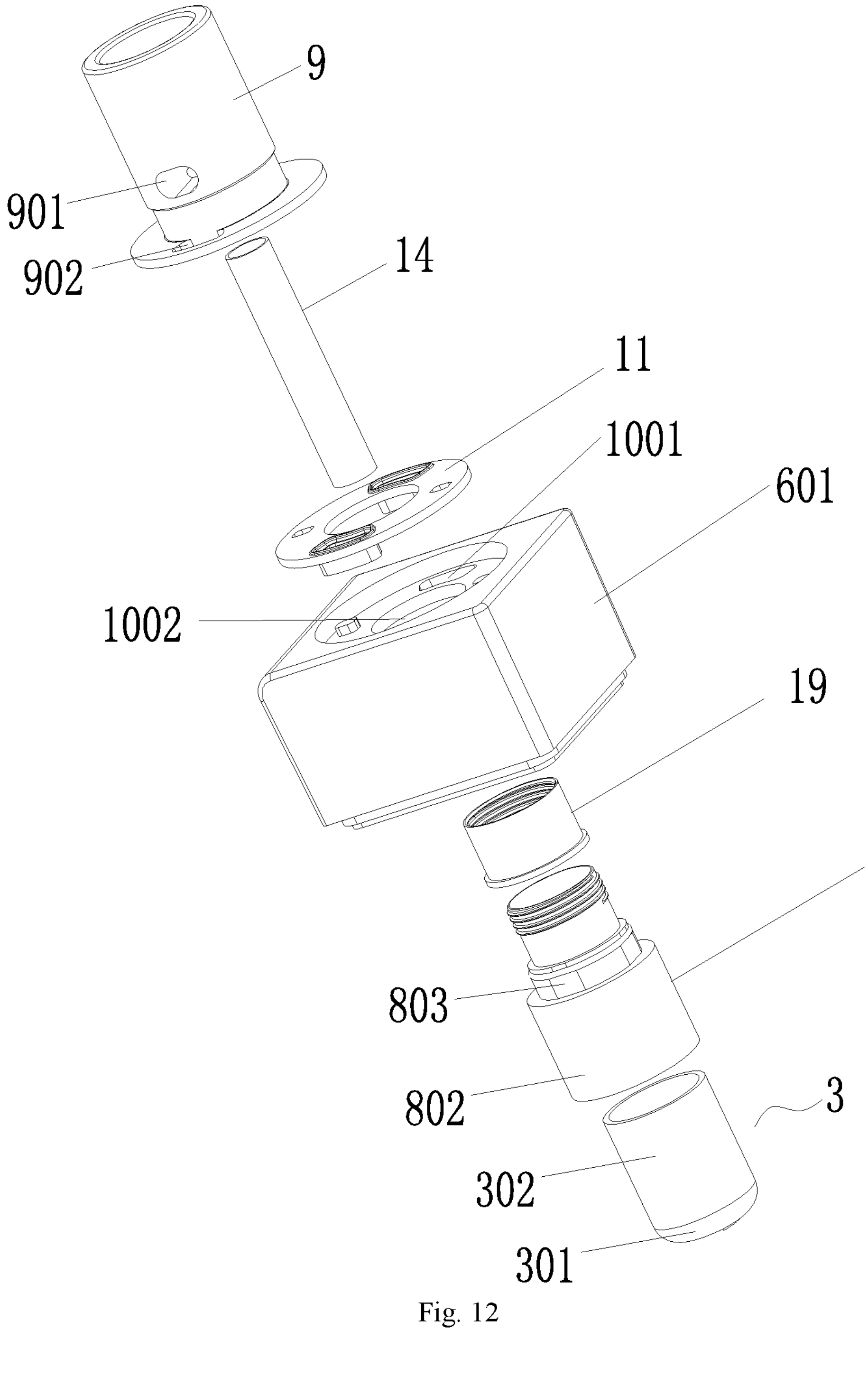
FIG. 12 is an exploded view of the upper part in FIG. 10.
Figure 13:
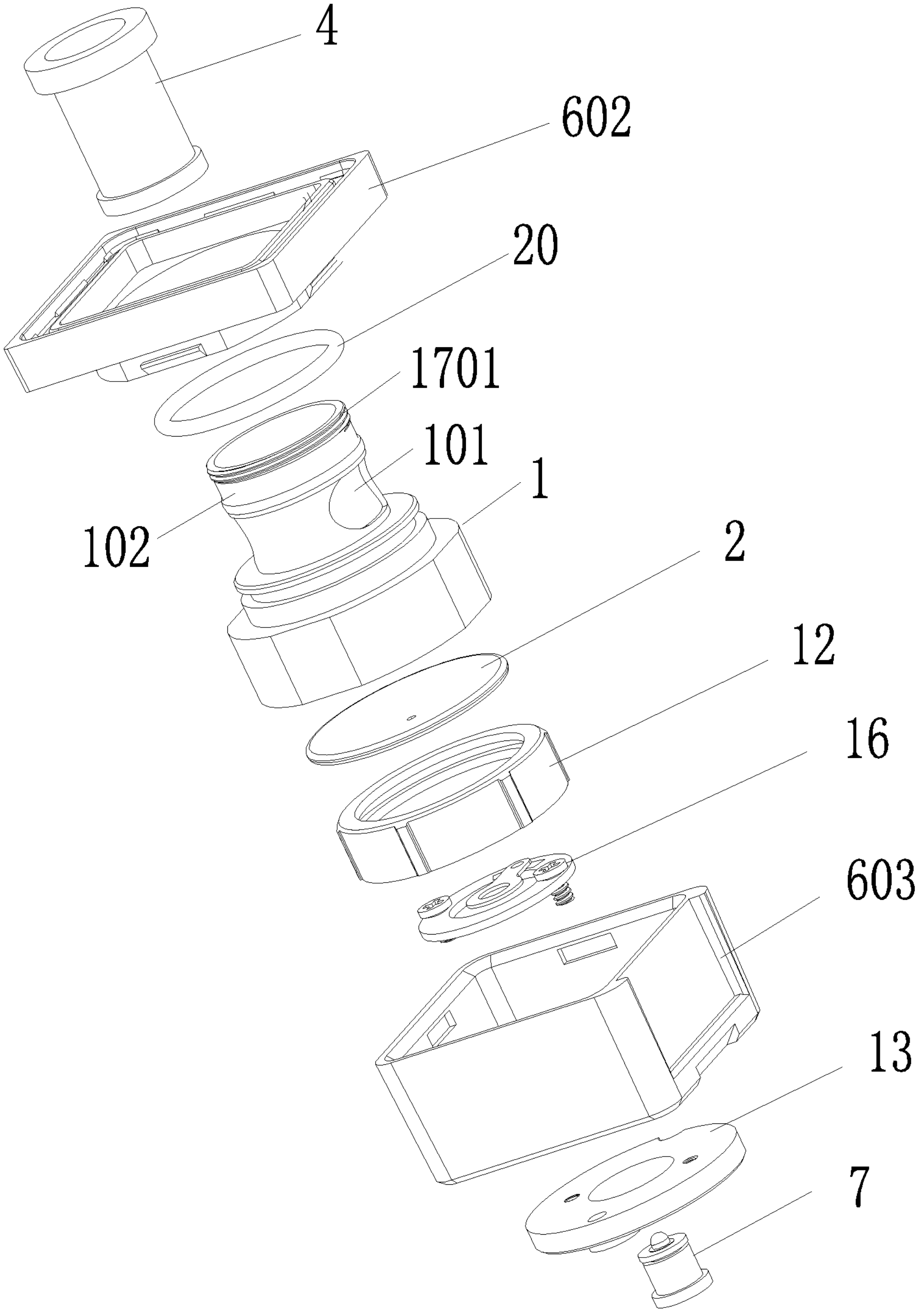
FIG. 13 is an exploded view of the lower part in FIG. 10.
Figure 14:
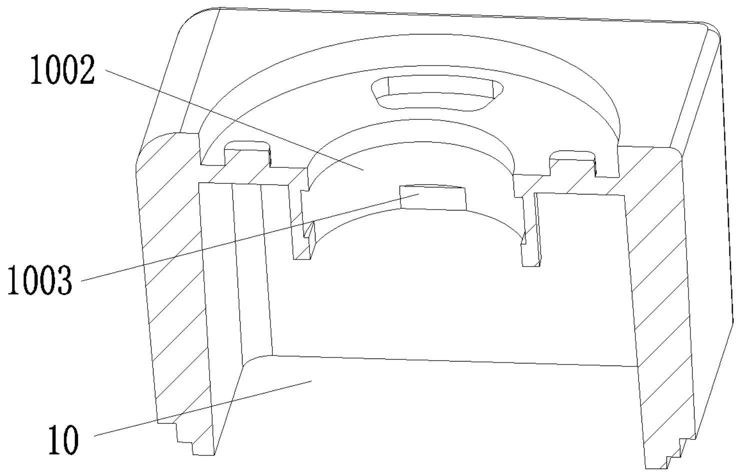
FIG. 14 is a schematic diagram of a structure at an air guide hole of an e-liquid bin.
Figure 15:
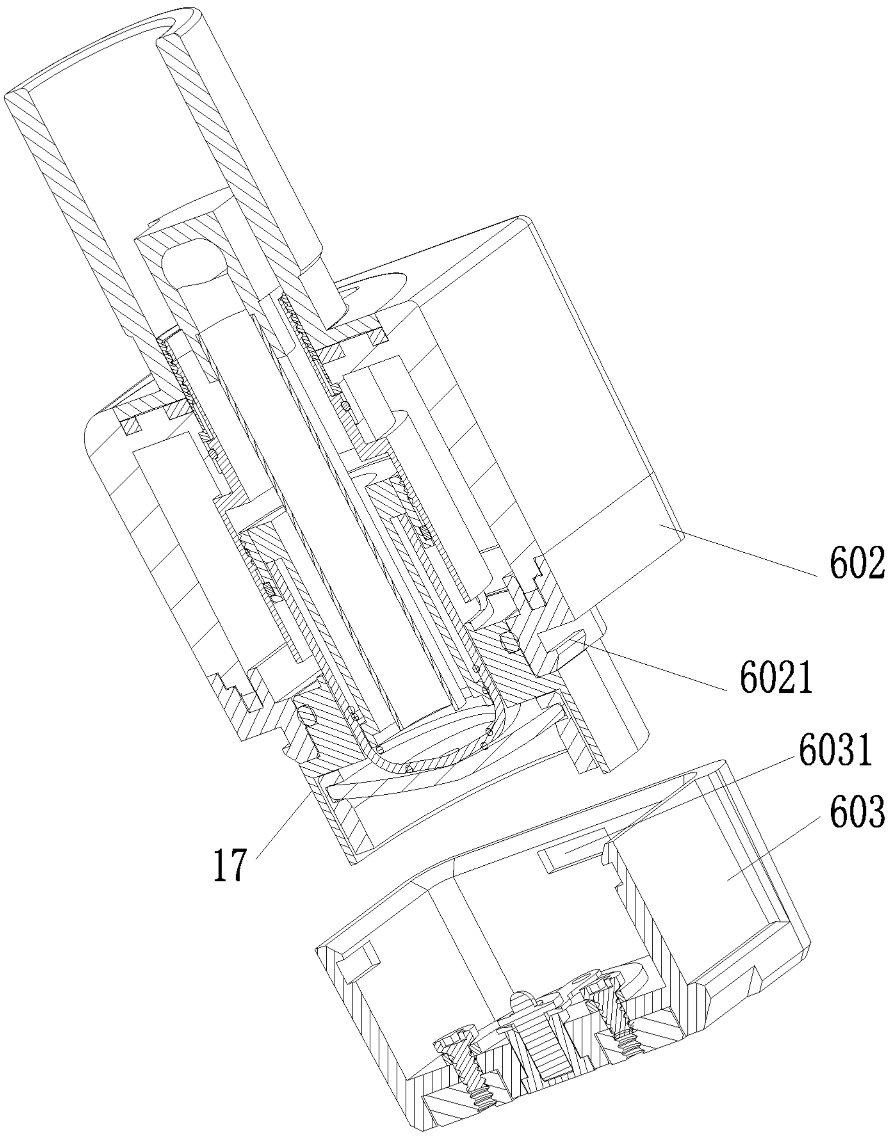
FIG. 15 is a schematic structural diagram showing that a bottom cover is opened to remove the atomization core.

The ultrasonic atomization sheet 2 is spherical, and when the ultrasonic atomization sheet 2 is working, liquid smoke generation matters atomized by ultrasonic are splashed around. When splashed droplets are accumulated on the spherical surface of the ultrasonic atomization sheet 2, the droplets can slide down to the center position of the ultrasonic atomization sheet 2 along with the spherical surface, and be recovered and atomized again. The e-liquid guide cotton 3 has a spherical portion 301 in contact with the concave surface of the ultrasonic atomization sheet 2, and when the ultrasonic atomization sheet 2 is working, the splashed droplets are directly absorbed by the spherical portion 301, so there are more liquid smoke generation matters on the spherical contact surface of the e-liquid guide cotton 3, and the smoke generation matters are guided more easily under the effect of gravity generated due to the curvature of the spherical surface and flow to the center position of the ultrasonic atomization sheet 2 more easily, so that the center position of the ultrasonic atomization sheet 2 with a higher temperature can be timely replenished with liquid, the temperature of the center position of the ultrasonic atomization sheet 2 can be reduced, the e-liquid guide cotton 3 can be prevented from being burnt through due to excessive temperature at the center position of the ultrasonic atomization sheet 2, the ultrasonic atomization sheet 2 would not be burnt out and has good working continuity and good atomization effect, and the e-liquid guide cotton 3 and the ultrasonic atomization sheet 2 have long service lives. Meanwhile, the area of spherical contact surface between the e-liquid guide cotton 3 and the ultrasonic atomization sheet 2 is larger, and more smoke is generated by means of atomization. The direction of smoke atomization is shown in FIG. 4. In addition, because the spherical ultrasonic atomization sheet 2 has the function of focusing energy, the required working power is low and the power endurance is strong.

Figure 3:
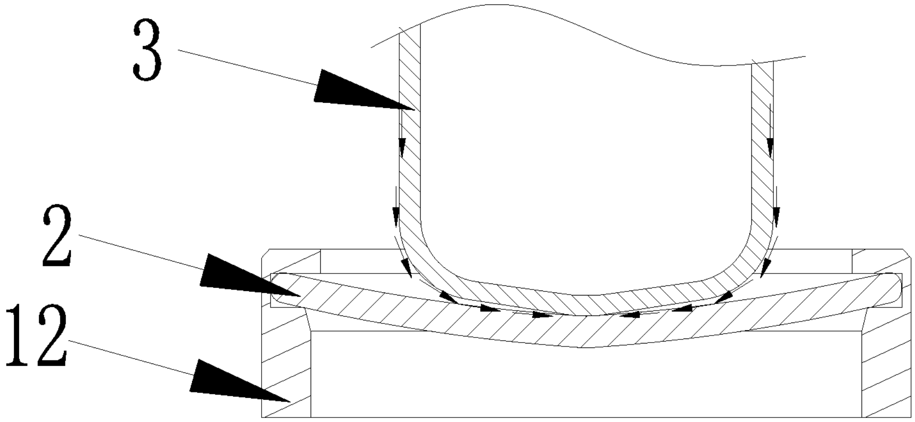
FIG. 3 is a schematic diagram of an e-liquid direction on e-liquid guide cotton.

The curvature of the spherical portion 301 of the e-liquid guide cotton 3 may be greater than or equal to the curvature of the spherical ultrasonic atomization sheet 2. When the curvature of the spherical portion 301 of the e-liquid guide cotton 3 is equal to the curvature of the spherical ultrasonic atomization sheet 2, the liquid smoke generation matters are guided more easily on the spherical contact surface. As shown in FIG. 3, when the curvature of the spherical portion 301 of the e-liquid guide cotton 3 is greater than the curvature of the spherical ultrasonic atomization sheet 2, a part of the liquid smoke generation matters remains in the gap between the spherical portion 301 of the e-liquid guide cotton 3 and the atomization surface of the ultrasonic atomization sheet 2, so that the liquid smoke generation matters can flow to the center of the ultrasonic atomization sheet 2 more easily, and the effects of liquid guide and atomization are better.

The ultrasonic atomization core 17 further comprises an inner sleeve 4 sleeved in the atomization sleeve 1, the e-liquid guide cotton 3 further comprises a hollow cylindrical portion 302, the hollow cylindrical portion 302 is connected with the spherical portion 301 to form a cup-shaped structure, the hollow cylindrical portion 302 is sandwiched between the atomization sleeve 1 and the inner sleeve 4, and the atomization sleeve 1 is provided with a through hole 101 that communicates the hollow cylindrical portion 302 with the outside.

The ultrasonic atomization core 17 further comprises a cotton pressing structure 5, one end of the cotton pressing structure 5 abuts against the inner sleeve 4, and the other end of the cotton pressing structure 5 abuts against the concave surface of the spherical portion 301 of the e-liquid guide cotton 3. The cotton pressing structure 5 can ensure reliable contact between the e-liquid guide cotton 3 and the atomization surface.

The cotton pressing structure 5 comprises a ring portion 501 and four first elastic strands 502, fixed ends of the first elastic strands 502 are connected with the ring portion 501, and free ends of the first elastic strands 502 abut against the spherical portion 301 of the e-liquid guide cotton 3. The first elastic strands 502 are uniformly arranged along the circumference of the ring portion 501, the free ends of the first elastic strands 502 are arc-shaped and attached to the concave surface of the spherical portion 301 of the e-liquid guide cotton 3, and the ring portion 501 abuts against the inner sleeve 4, so that the e-liquid guide cotton 3 is uniformly stressed.

As shown in FIGS. 5-9, an ultrasonic atomizer comprises a housing 6 in which the ultrasonic atomization core 17 is arranged.

The housing 6 is provided with an elastic electrode 7 that abuts against the convex surface of the ultrasonic atomization sheet 2.

The elastic electrode 7 comprises a cylindrical portion 701 and four second elastic strands 702, fixed ends of the second elastic strands 702 are connected with the cylindrical portion 701, and free ends of the second elastic strands 702 abut against the convex surface of the ultrasonic atomization sheet 2. The second elastic strands 702 are uniformly arranged on an end surface of the cylindrical portion 701, and the free ends of the second elastic strands 702 are arc-shaped and attached to the convex surface of the ultrasonic atomization sheet 2. The elastic electrode 7 with the above-mentioned structure can ensure that four sides of the ultrasonic atomization sheet 2 are stressed uniformly, can prevent the ultrasonic atomization sheet 2 from being broken due to a single direction of force applied thereto, and it is easy to assemble the ultrasonic atomization sheet 2.

The housing 6 comprises a top cover 601, a base 602 and a bottom cover 603 that are connected in sequence.

The atomization core 17 is connected with the top cover 601 through a connecting sleeve 8 and arranged in the top cover 601.

A top of the top cover 601 is provided with a rotatable suction nozzle 9. The suction nozzle 9 is provided with an air inlet 901 and an e-liquid injection hole 902.

An e-liquid bin 10 is arranged in the top cover 601. The through hole 101 communicates the hollow cylindrical portion 302302 with the e-liquid bin 10. The suction nozzle 9 is rotated, making the e-liquid injection hole 902 to align or misalign with an e-liquid passing hole 1001 of the e-liquid bin 10, to open or close the e-liquid bin 10 for injecting e-liquid.

A sealing gasket 11 is arranged between the e-liquid bin 10 and the suction nozzle 9.

The ultrasonic atomization sheet 2 is fixed in the bottom cover 603 through a silica gel seat 12.

The elastic electrode 7 is arranged at the bottom of the bottom cover 603. The bottom cover 603 is further provided with an electrode ring 13. A protective sheet 16 is arranged in the bottom cover 603.

An air pipe 14 is arranged in the housing 6, one end of the air pipe 14 is connected with the suction nozzle 9 and communicated with the air inlet 901, and the other end of the air pipe 14 extends into the inner sleeve 4 and is opposite to the concave surface of the spherical portion 301 of the e-liquid guide cotton 3. The air inlet 901, the air pipe 14, the concave surface of the spherical portion 301 of the e-liquid guide cotton 3, an air outlet passage 15, and the suction nozzle 9 are communicated in sequence.

Embodiment 2

As shown in FIGS. 10-15, an ultrasonic atomizer in an ultrasonic electronic cigarette comprises a housing 6, an atomization core 17 is arranged in the housing 6, and the atomization core 17 is connected to the housing 6 through a connecting sleeve 8; the housing 6 comprises a top cover 601, a base 602 and a bottom cover 603 connected in sequence, the base 602 is detachably connected with the bottom cover 603, a middle section of the outer side wall of the atomization core 17 is in clearance fit with the inner side wall of the base 602, an upper section of the outer side wall of the atomization core 17 is provided with an external threaded portion 1701, and the inner side wall of the connecting sleeve 8 is provided with an internal threaded portion 801 matching the external threaded portion 1701. When the atomization core 17 is assembled, the external threaded portion 1701 is fixedly connected to the internal threaded portion 801. When the atomization core 17 is removed, the bottom cover 603 is removed from the base 602 to expose a lower section of the atomization core 17, and the lower section of the atomization core 17 is held by hand and rotated to take out the atomization core 17 from the housing 6 of the atomizer, so that the atomization core 17 is replaced separately, the discard of the whole atomizer is avoided when the atomization core 17 is damaged, and the use cost is reduced.

In this embodiment, the bottom cover 603 is connected with the base 602 by a hook, the inner side wall of the bottom cover 603 is provided with a clamping groove 6031, and the outer side wall of the base 602 is provided with a hook 6021 matching the clamping groove 6031. When the atomization core 17 is removed, the bottom cover 603 is pulled out first to separate the clamping groove 6031 from the hook 6021, and then the atomization core 17 can be removed, which can protect the atomization core 17 from external dust pollution and improve the purity of smoke.

A bottom end of the atomization core 17 abuts against an inner bottom surface of the bottom cover 603. The bottom end of the atomization core 17 abuts against the inner bottom surface of the bottom cover 603, so that the atomization core 17 has better electrical connection stability after assembly.

An e-liquid bin 10 is arranged in the top cover 601, the atomization core 17 comprises an atomization sleeve 1, an ultrasonic atomization sheet 2 and e-liquid guide cotton 3 connected with an atomization surface of the ultrasonic atomization sheet 2 are arranged in the atomization sleeve 1, and the atomization sleeve 1 is provided with a through hole 101 that communicates the e-liquid guide cotton 3 with the e-liquid bin 10; a middle section of the outer side wall of the atomization sleeve 1 is in clearance fit with the inner side wall of the base 602, and the external threaded portion 1701 is arranged on an upper section of the outer side wall of the atomization sleeve 1.

The connecting sleeve 8 has a baffle portion 802 opposite to an upper part of the through hole 101, and an e-liquid passing gap 18 that communicates the e-liquid bin 10 with the through hole 101 is formed between the baffle portion 802 and the atomization sleeve 1.

During normal smoking, the baffle portion 802 does not completely cover the through hole 101, and e-liquid in the e-liquid bin 10 passes through the e-liquid passing gap 18 and the through hole 101 in sequence to supply e-liquid for the e-liquid guide cotton 3. When the atomization core 17 is removed, the e-liquid at the through hole 101 slowly flows through the baffle portion 802 and flows into the e-liquid bin 10 with the removal of the atomization core 17, so as to prevent e-liquid leakage when the atomization core 17 is removed. Due to the baffle portion 802, when the atomization core 17 is removed, a lot of e-liquid can be stored in the e-liquid bin 10, which prevents the e-liquid from overflowing.

A top of the top cover 601 is provided with a suction nozzle 9 that is axially rotatable about the axis of the top cover, and the suction nozzle 9 is provided with an e-liquid injection hole 902 that can be aligned or misaligned with the e-liquid passing hole 1001 of the e-liquid bin 10.

The suction nozzle 9 is rotated to make the e-liquid injection hole 902 to align or misalign with the e-liquid passing hole 1001 to open or close the e-liquid bin 10 for injecting e-liquid.

The atomizer further comprises a driving mechanism, and the rotation of the suction nozzle 9 drives the connecting sleeve 8 through the driving mechanism to move axially along the electronic cigarette to open or close the through hole 101; the inner side wall of the connecting sleeve 8 has an inner smooth portion 804 above the internal threaded portion 801, and the outer side wall of the atomization sleeve 1 has an outer smooth portion 102 below the external threaded portion 1701; when the connecting sleeve 8 moves axially along the electronic cigarette, the inner smooth portion 804 is opposite to the external threaded portion 1701, and the outer smooth portion 102 is opposite to the internal threaded portion 801, so that the connecting sleeve 8 would not get stuck and fail to close or open the through hole 101, and the atomization core 17 would not be separated from the e-liquid bin or shake due to the axial movement of the connecting sleeve 8.

When e-liquid is to be injected, the suction nozzle 9 is rotated to open the e-liquid passing hole 1001 on the e-liquid bin 10, and the rotation of the suction nozzle 9 drives the connecting sleeve 8 through the driving mechanism to move axially to close the through hole 101, so as to prevent e-liquid leakage during e-liquid injection. After the e-liquid is injected, the suction nozzle 9 is rotated to close the e-liquid passing hole 1001 on the e-liquid bin 10, and the rotation of the suction nozzle 9 drives the connecting sleeve 8 through the driving mechanism to move axially to open the through hole 101, so as to normally guide e-liquid for smoking.

The driving mechanism comprises a fixing sleeve 19, an upper section of the fixing sleeve 19 is fixedly connected with the suction nozzle 9, a lower section of the fixing sleeve 19 passes through an air guide hole 1002 on the e-liquid bin 10 and is in clearance fit with the e-liquid bin 10, a top section of the outer side wall of the connecting sleeve 8 is screwed with a top section of the inner side wall of the fixing sleeve 19, a middle section of the outer side wall of the connecting sleeve 8 has an outer limit plane 803 that limits the circumferential rotation of the connecting sleeve 8, and the inner side wall of the air guide hole 1002 has an inner limit plane 1003 corresponding to the outer limit plane 803.

The upper section of the fixing sleeve 19 is in clearance fit with the suction nozzle 9, the lower section of the fixing sleeve 19 is arranged in the air guide hole 1002, the fixing sleeve 19 can rotate circumferentially relative to the e-liquid bin 10, and the rotation of the suction nozzle 9 can drive the fixing sleeve 19 to rotate circumferentially relative to the e-liquid bin 10. Due to the coordination of the outer limit plane 803 and the inner limit plane 1003, the circumferential rotation of the connecting sleeve 8 is limited. Therefore, when the suction nozzle 9 is rotated, the fixing sleeve 19 rotates and the fixing sleeve 19 is axially fixed, which drives the connecting sleeve 8 to move up and down relative to the e-liquid bin 10, that is, when the suction nozzle 9 is rotated, the connecting sleeve 8 moves axially along the electronic cigarette to open or close the through hole 101.

The ultrasonic atomization sheet 2 is spherical, the e-liquid guide cotton 3 has a spherical portion 301, the curvature of the spherical portion 301 of the e-liquid guide cotton 3 is greater than or equal to the curvature of the spherical ultrasonic atomization sheet 2, and the convex surface of the spherical portion 301 of the e-liquid guide cotton 3 is in contact with the concave surface of the ultrasonic atomization sheet 2.

Since the ultrasonic atomization sheet 2 is spherical, and the e-liquid guide cotton 3 has a spherical portion 301 in contact with the concave surface of the ultrasonic atomization sheet 2, the e-liquid guide cotton 3 guides e-liquid more easily on the spherical contact surface, the e-liquid can flow to the center position of the ultrasonic atomization sheet 2 more easily, the center position of the ultrasonic atomization sheet 2 with a higher temperature can be timely replenished with liquid, the temperature of the center position of the ultrasonic atomization sheet 2 can be reduced, the e-liquid guide cotton 3 can be prevented from being burnt through due to excessive temperature at the center position of the ultrasonic atomization sheet 2, the ultrasonic atomization sheet 2 would not be dried out, the atomization effect is good, and the e-liquid guide cotton 3 and the ultrasonic atomization sheet 2 have long service lives. Meanwhile, the area of spherical contact surface between the e-liquid guide cotton 3 and the ultrasonic atomization sheet 2 is larger, and more smoke is generated by means of atomization. The direction of smoke atomization is shown in FIG. 4. In addition, because the spherical ultrasonic atomization sheet 2 has the function of focusing energy, the required working power is low and the power endurance is strong.

The curvature of the spherical portion 301 of the e-liquid guide cotton 3 may be greater than or equal to the curvature of the spherical ultrasonic atomization sheet 2. When the curvature of the spherical portion 301 of the e-liquid guide cotton 3 is equal to the curvature of the spherical ultrasonic atomization sheet 2, the e-liquid is guided faster on the spherical contact surface. As shown in FIG. 3, when the curvature of the spherical portion 301 of the e-liquid guide cotton 3 is greater than the curvature of the spherical ultrasonic atomization sheet 2, a certain gap is formed when the spherical portion 301 of the e-liquid guide cotton 3 is in contact with the concave surface of the ultrasonic atomization sheet 2, and a part of the e-liquid remains in the gap, so that the e-liquid can flow to the center of the ultrasonic atomization sheet 2 more easily, and the effects of liquid guide and atomization are better.

The central axis of the spherical portion 301 of the e-liquid guide cotton 3 is collinear with the central axis of the ultrasonic atomization sheet 2.

The atomizer further comprises an inner sleeve 4 sleeved in the atomization sleeve 1, the e-liquid guide cotton 3 further comprises a hollow cylindrical portion 302, the hollow cylindrical portion 302 is connected with the spherical portion 301 to form a cup-shaped structure, the hollow cylindrical portion 302 is sandwiched between the atomization sleeve 1 and the inner sleeve 4, and the atomization sleeve 1 is provided with a through hole 101 that communicates the hollow cylindrical portion 302 with the outside.

The atomizer further comprises a cotton pressing structure 5, one end of the cotton pressing structure 5 abuts against the inner sleeve 4, and the other end of the cotton pressing structure 5 abuts against the concave surface of the spherical portion 301 of the e-liquid guide cotton 3. The cotton pressing structure 5 is a spring.

The cotton pressing structure 5 can ensure reliable contact between the e-liquid guide cotton 3 and the atomization surface.

A sealing ring 20 is arranged between the outer side wall of the atomization sleeve 1 and the inner side wall of the base 602 to prevent e-liquid leakage of the e-liquid bin.

The bottom cover 603 is provided with an elastic electrode 7 that abuts against the convex surface of the ultrasonic atomization sheet 2.

The suction nozzle 9 is provided with an air inlet 901.

A sealing gasket 11 is arranged between the e-liquid bin 10 and the suction nozzle 9.

The ultrasonic atomization sheet 2 is fixed in the bottom cover 603 through a silica gel seat 12.

The elastic electrode 7 is arranged at the bottom of the bottom cover 603. The bottom cover 603 is further provided with an electrode ring 13. A protective sheet 16 is arranged in the bottom cover 603.

An air pipe 14 is arranged in the housing 6, one end of the air pipe 14 is connected with the suction nozzle 9 and communicated with the air inlet 901, and the other end of the air pipe 14 extends into the inner sleeve 4 and is opposite to the concave surface of the spherical portion 301 of the e-liquid guide cotton 3. The air inlet 901, the air pipe 14, the concave surface of the spherical portion 301 of the e-liquid guide cotton 3, an air outlet passage 15, and the suction nozzle 9 are communicated in sequence.

The embodiments of the present invention are described above with reference to the drawings, but the present invention is not limited to the specific embodiments. The specific embodiments described above are merely illustrative but not limited. Many forms may also be made by those of ordinary skill in the art under the enlightenment of the present invention without departing from the purpose of the present invention and the scope of the claims, and all these forms fall into the scope of the present invention.

The invention claimed is:

1. An ultrasonic atomization core, comprising:

an atomization sleeve (1), wherein:

the atomization sleeve (1) is provided with an ultrasonic atomization sheet (2) and e-liquid guide cotton (3) that communicates the outside with an atomization surface of the ultrasonic atomization sheet (2), the atomization surface of the ultrasonic atomization sheet (2) is a concave surface, the e-liquid guide cotton (3) has a convex surface corresponding to the atomization surface, and a curvature of the convex surface of the e-liquid guide cotton (3) is greater than a curvature of the atomization surface of the ultrasonic atomization sheet (2), such that a gap is formed when the convex surface of the e-liquid guide cotton (3) is in contact with a center of the atomization surface of the ultrasonic atomization sheet (2).

2. The ultrasonic atomization core according to claim 1, wherein:

the ultrasonic atomization sheet (2) is spherical, the e-liquid guide cotton (3) has a spherical portion (301), a curvature of the spherical portion (301) of the e-liquid guide cotton (3) is greater than the curvature of the spherical ultrasonic atomization sheet (2), and a convex surface of the spherical portion (301) of the e-liquid guide cotton (3) is in contact with the concave surface of the ultrasonic atomization sheet (2).

3. The ultrasonic atomization core according to claim 2, wherein a central axis of the spherical portion (301) of the e-liquid guide cotton (3) is collinear with a central axis of the ultrasonic atomization sheet (2).

4. The ultrasonic atomization core according to claim 2, further comprising an inner sleeve (4) sleeved in the atomization sleeve (1), wherein:

the e-liquid guide cotton (3) further comprises a hollow cylindrical portion (302), the hollow cylindrical portion (302) is connected with the spherical portion (301) to form a cup-shaped structure, the hollow cylindrical portion (302) is sandwiched between the atomization sleeve (1) and the inner sleeve (4), and the atomization sleeve (1) is provided with a through hole (101) that communicates the hollow cylindrical portion (302) with the outside.

5. The ultrasonic atomization core according to claim 4, further comprising a cotton pressing structure (5), wherein:

one end of the cotton pressing structure (5) abuts against the inner sleeve (4), and another end of the cotton pressing structure (5) abuts against the concave surface of the spherical portion (301) of the e-liquid guide cotton (3).

6. The ultrasonic atomization core according to claim 5, wherein:

the cotton pressing structure (5) comprises a ring portion (501) and at least three first elastic strands (502), fixed ends of the first elastic strands (502) are connected with the ring portion (501), free ends of the first elastic strands (502) abut against the spherical portion (301) of the e-liquid guide cotton (3), and the ring portion (501) abuts against the inner sleeve (4).

7. The ultrasonic atomization core according to claim 6, wherein:

the first elastic strands (502) are uniformly arranged along the circumference of the ring portion (501), and the free ends of the first elastic strands (502) are arc-shaped and attached to the concave surface of the spherical portion (301) of the e-liquid guide cotton (3).

8. An ultrasonic atomizer, comprising:

a housing (6), wherein an ultrasonic atomization core (17) is arranged in the housing (6), the ultrasonic atomization core comprising:

an atomization sleeve (1), wherein:

the atomization sleeve (1) is provided with an ultrasonic atomization sheet (2) and e-liquid guide cotton (3) that communicates the outside with an atomization surface of the ultrasonic atomization sheet (2), the atomization surface of the ultrasonic atomization sheet (2) is a concave surface, the e-liquid guide cotton (3) has a convex surface corresponding to the atomization surface, and a curvature of the convex surface of the e-liquid guide cotton (3) is greater than a curvature of the atomization surface of the ultrasonic atomization sheet (2), such that a gap is formed when the convex surface of the e-liquid guide cotton (3) is in contact with a center of the atomization surface of the ultrasonic atomization sheet (2).

9. The ultrasonic atomizer according to claim 8, wherein:

the ultrasonic atomization sheet (2) is spherical, the e-liquid guide cotton (3) has a spherical portion (301), a curvature of the spherical portion (301) of the e-liquid guide cotton (3) is greater than the curvature of the spherical ultrasonic atomization sheet (2), and a convex surface of the spherical portion (301) of the e-liquid guide cotton (3) is in contact with the concave surface of the ultrasonic atomization sheet (2); and the housing (6) is provided with an elastic electrode (7) that abuts against the convex surface of the ultrasonic atomization sheet (2).

10. The ultrasonic atomizer according to claim 9, wherein:

the elastic electrode (7) comprises a cylindrical portion (701) and at least three second elastic strands (702), fixed ends of the second elastic strands (702) are connected with the cylindrical portion (701), and free ends of the second elastic strands (702) abut against the convex surface of the ultrasonic atomization sheet (2).

11. The ultrasonic atomizer according to claim 10, wherein:

the second elastic strands (702) are uniformly arranged on an end surface of the cylindrical portion (701), and the free ends of the second elastic strands (702) are arc-shaped and attached to the convex surface of the ultrasonic atomization sheet (2).

12. The ultrasonic atomizer according to claim 8, wherein:

the atomization core (17) is connected to the housing (6) through a connecting sleeve (8);

the housing (6) comprises a top cover (601), a base (602), and a bottom cover (603) that are connected in sequence, the base (602) is detachably connected to the bottom cover (603), a middle section of an outer side wall of the atomization core (17) is in clearance fit with an inner side wall of the base (602), an upper section of the outer side wall of the atomization core (17) is provided with an external threaded portion (1701), and an inner side wall of the connecting sleeve (8) is provided with an internal threaded portion (801) matching the external threaded portion (1701).

13. The ultrasonic atomizer according to claim 12, wherein:

an e-liquid bin (10) is arranged in the top cover (601), and the atomization sleeve (1) is provided with a through hole (101) that communicates the e-liquid guide cotton (3) with the e-liquid bin (10); and a middle section of an outer side wall of the atomization sleeve (1) is in clearance fit with the inner side wall of the base (602), and the external threaded portion (1701) is arranged on an upper section of the outer side wall of the atomization sleeve (1).

14. The ultrasonic atomizer according to claim 13, wherein:

the connecting sleeve (8) has a baffle portion (802) opposite to an upper part of the through hole (101), and an e-liquid passing gap (18) that communicates the e-liquid bin (10) with the through hole (101) is formed between the baffle portion (802) and the atomization sleeve (1).

15. The ultrasonic atomizer according to claim 13, wherein:

a top of the top cover (601) is provided with a suction nozzle (9) that is axially rotatable about an axis of the top cover, and the suction nozzle (9) is provided with an e-liquid injection hole (902) that can be aligned or misaligned with an e-liquid passing hole (1001) of the e-liquid bin (10);

the ultrasonic atomizer further comprises a driving mechanism, and rotation of the suction nozzle (9) drives the connecting sleeve (8) through the driving mechanism to move axially along an electronic cigarette to open or close the through hole (101);

the inner side wall of the connecting sleeve (8) has an inner smooth portion (804) above the internal threaded portion (801), and the outer side wall of the atomization sleeve (1) has an outer smooth portion (102) below the external threaded portion (1701); and when the connecting sleeve (8) moves axially along the electronic cigarette, the inner smooth portion (804) is opposite to the external threaded portion (1701), and the outer smooth portion (102) is opposite to the internal threaded portion (801).

16. The ultrasonic atomizer according to claim 15, wherein:

the driving mechanism comprises a fixing sleeve (19), an upper section of the fixing sleeve (19) is fixedly connected with the suction nozzle (9), a lower section of the fixing sleeve (19) passes through an air guide hole (1002) on the e-liquid bin (10) and is in clearance fit with the e-liquid bin (10), a top section of the outer side wall of the connecting sleeve (8) is screwed with a top section of the inner side wall of the fixing sleeve (19), a middle section of the outer side wall of the connecting sleeve (8) has an outer limit plane (803) that limits the circumferential rotation of the connecting sleeve (8), and the inner side wall of the air guide hole (1002) has an inner limit plane (1003) corresponding to the outer limit plane (803).

17. An ultrasonic electronic cigarette, comprising an ultrasonic atomizer, the ultrasonic atomizer comprising:

a housing (6), wherein an ultrasonic atomization core (17) is arranged in the housing (6), the ultrasonic atomization core comprising:

an atomization sleeve (1), wherein:

the atomization sleeve (1) is provided with an ultrasonic atomization sheet (2) and e-liquid guide cotton (3) that communicates the outside with an atomization surface of the ultrasonic atomization sheet (2), the atomization surface of the ultrasonic atomization sheet (2) is a concave surface, the e-liquid guide cotton (3) has a convex surface corresponding to the atomization surface, and a curvature of the convex surface of the e-liquid guide cotton (3) is greater than a curvature of the atomization surface of the ultrasonic atomization sheet (2), such that a gap is formed when the convex surface of the e-liquid guide cotton (3) is in contact with a center of the atomization surface of the ultrasonic atomization sheet (2).

* * * * *